United States Patent
Iwamoto et al.

(10) Patent No.: US 10,063,676 B2
(45) Date of Patent: Aug. 28, 2018

(54) ELECTRONIC DEVICE PROVIDED WITH REMOVABLE BATTERY

(71) Applicant: Panasonic Intellectual Property Management Co., Ltd., Osaka (JP)

(72) Inventors: Akira Iwamoto, Osaka (JP); Kenichi Shindo, Osaka (JP); Takeshi Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/665,655

(22) Filed: Aug. 1, 2017

(65) Prior Publication Data

US 2017/0331933 A1    Nov. 16, 2017

Related U.S. Application Data

(63) Continuation of application No. 14/832,129, filed on Aug. 21, 2015, now Pat. No. 9,756,157, which is a
(Continued)

(30) Foreign Application Priority Data

Dec. 25, 2013    (JP) .................................. 2013-267795

(51) Int. Cl.
*H04M 1/02* (2006.01)
*H01M 2/10* (2006.01)
(Continued)

(52) U.S. Cl.
CPC ....... *H04M 1/0262* (2013.01); *H01M 2/1066* (2013.01); *H01M 2/20* (2013.01);
(Continued)

(58) Field of Classification Search
CPC .............. H01R 13/521; H01R 13/5219; H01R 1/0262; H01R 2/30; H01R 1/0274; H01R 2/1066; H01R 2/20; H01R 2220/30
(Continued)

(56) References Cited

U.S. PATENT DOCUMENTS 3,815,871 A * 6/1974 Carlson ................. F16K 5/0414
251/310
5,540,450 A * 7/1996 Hayashi ............. H01R 13/5205
174/152 G
(Continued)

FOREIGN PATENT DOCUMENTS

JP        61-85767        5/1986
JP        5-259962        10/1993
(Continued)

OTHER PUBLICATIONS

International Search Report issued in International Application No. PCT/JP2014/004327 dated Nov. 4, 2014.
(Continued)

*Primary Examiner* — Dimary Lopez Cruz
*Assistant Examiner* — Abhishek Rathod
(74) *Attorney, Agent, or Firm* — Wenderoth, Lind & Ponack, L.L.P.

(57) ABSTRACT

A connector reception portion is configured such that, when a battery pack is housed in a battery housing portion, a battery cylindrical portion is positioned at a connector reception portion of the battery housing portion, and thereafter, while the battery pack is inclined so that the battery cylindrical portion is located diagonally forward and downward with respect to a battery mounting surface, the battery cylindrical portion is fitted within a peripheral wall of the connector reception portion, and the battery pack is inclined so that an inclination angle is smaller while the battery pack
(Continued)

is pushed forward in a fitted state, and thereby the battery pack is laid on the battery mounting surface of the battery housing portion, and a battery connector is connected to connection terminals in a direction parallel to the battery mounting surface.

7 Claims, 6 Drawing Sheets

Related U.S. Application Data continuation of application No. PCT/JP2014/004237, filed on Aug. 19, 2014.

(51) Int. Cl.
  H01M 2/20     (2006.01)
  H01R 13/52    (2006.01)
  H01M 2/30     (2006.01)

(52) U.S. Cl.
  CPC .......... *H01M 2/30* (2013.01); *H01R 13/5219* (2013.01); *H04M 1/0274* (2013.01); *H01M 2220/30* (2013.01)

(58) Field of Classification Search
  USPC .............. 429/96, 97, 100, 123; 439/271–273
  See application file for complete search history.

(56) References Cited

U.S. PATENT DOCUMENTS

| | | | |
|---|---|---|---|
| 5,933,330 A | 8/1999 | Beutler | |
| 6,515,450 B1 | 2/2003 | Kaiho | |
| 7,346,366 B2 | 3/2008 | Park | |
| 7,347,723 B1* | 3/2008 | Daily | ................. H01R 13/5219 439/271 |
| 8,981,719 B2 | 3/2015 | Inoue | |
| 2003/0085685 A1 | 5/2003 | Usui | |
| 2003/0085686 A1 | 5/2003 | Haga | |
| 2006/0063064 A1 | 3/2006 | Ishihara | |
| 2008/0100262 A1 | 5/2008 | Ozaki | |
| 2009/0169982 A1 | 7/2009 | Goto | |
| 2009/0219676 A1 | 9/2009 | Murakata | |
| 2010/0085691 A1 | 4/2010 | Yeh | |
| 2010/0099016 A1 | 4/2010 | Chu | |
| 2011/0211300 A1 | 9/2011 | Mori et al. | |
| 2012/0150248 A1 | 6/2012 | Chi | |
| 2012/0268872 A1 | 10/2012 | Shimazaki | |
| 2012/0320554 A1 | 12/2012 | Chiang | |
| 2013/0252061 A1 | 9/2013 | Kim | |
| 2014/0178738 A1 | 6/2014 | Iwamoto | |

FOREIGN PATENT DOCUMENTS

| | | |
|---|---|---|
| JP | 2008-288138 | 11/2008 |
| JP | 2009-259718 | 11/2009 |
| JP | 2011-181255 | 9/2011 |
| JP | 2011-204696 | 10/2011 |
| JP | 2014-93231 | 5/2014 |

OTHER PUBLICATIONS

International Preliminary Report on Patentability issued in International Application No. PCT/JP2014/004237 dated Jun. 28, 2016.

* cited by examiner

ELECTRONIC DEVICE PROVIDED WITH REMOVABLE BATTERY

CROSS-REFERENCE TO RELATED APPLICATIONS

This is a continuation application of application Ser. No. 14/832,129, filed Aug. 21, 2015, which is a continuation application of International Application No. PCT/JP2014/004237, with an international filing date of Aug. 19, 2014, which claims priority from Japanese Patent Application No. JP2013-267795 filed on Dec. 25, 2013, the content of which is incorporated herein by reference.

BACKGROUND OF THE INVENTION

1. Field of the Invention

The technical field relates to an electronic device provided with a removable battery.

2. Description of the Related Art

As is well known, in an electronic device such as a personal computer and an information terminal device, in particular, in a portable electronic device such as a so-called tablet-type or note-type personal computer, a tablet-type portable-type information terminal, it is common that such an electronic device is used in such a state that the removable battery is housed in a battery housing portion of a device enclosure.

Such a battery housing portion is provided with a connection terminal connected to a connector (battery terminals) of the housed battery, and there is a case where a sealing structure is provided for sealing in order to waterproof, etc. a connection portion between the connection terminals of this battery housing portion and the battery connector. In particular, in the portable electronic device, again particularly, in the electronic device used in such a state that the battery is exposed to an outside without using a cover and the like for covering the battery housing portion, such a sealing waterproof structure is important.

For example, Japanese Patent Publication No. JPH5-259962A discloses such a configuration that a connection portion between connection terminals of a battery housing portion and a battery connector is sealed by mounting a rubber ring, which has a circular cross-sectional surface, along an outer circumference of a cylindrical portion at the side of a battery. In this case, the rubber ring is usually mounted so as to be orthogonal to an axis line of the cylindrical portion in a side surface view.

By the way, for example, with respect to the battery housing portion provided on the back surface of an enclosure, in the case where the battery is not inserted/pulled from the side surface of the enclosure, but the battery is attached and detached from the back surface side of the enclosure, etc., it is necessary that the cylindrical portion where a ring-shaped sealing member is mounted along the outer circumference is positioned at a connector reception portion where the connection terminals at the side of enclosure side are provided, and thereafter, the battery is inclined so that the cylindrical portion at the side of the battery is located diagonally forward down with respect to a battery mounting surface of the battery housing portion, and the battery is inclined and mounted on the battery mounting surface of the housing portion so that an inclination angle thereof becomes smaller while pushing the battery forward, and thereafter, the connector is connected to the connection terminals in a direction parallel to the battery mounting surface.

In the case of such a structure, in the ring-shaped sealing member, in particular, while the battery is inclined at a large inclination angle, a pressing state with respect to the sealing member at a top side of the cylindrical portion largely differs from a pressing state with respect to the sealing member at a bottom side of the cylindrical portion. Accordingly, in the case where the ring-shaped sealing member is usually mounted so as to be orthogonal to the axis line of the cylindrical portion in the side surface view, in particular, there is such a problem that it is easy for an unreasonable force to be applied to a portion corresponding to the bottom side of the cylindrical portion of the sealing member.

SUMMARY

In view of the above, an object of the present disclosure is basically to suppress the applied unreasonable force to the ring-shaped sealing member for sealing the connection portion between the connection terminals of the battery housing portion and the battery connector even in the case where the battery is attached and detached from the back surface side of the enclosure.

According to an electronic device of the present disclosure, (a) the electronic device includes a battery provided with a battery cylindrical portion having an outer circumference where a ring-shaped sealing member is mounted, a connector being provided in the battery cylindrical portion, and an enclosure having a recessed housing portion for housing the battery. (b) A connector reception portion for opening along a battery mounting surface of the housing portion and for receiving the battery cylindrical portion is provided in a predetermined side wall portion of the housing portion. (c) The connector reception portion comprises: a peripheral wall to be fitted with the battery cylindrical portion by insertion of the battery cylindrical portion, the peripheral wall configured to include a bottom wall having a surface connected to the same surface as the battery mounting surface, a ceiling wall disposed in opposition to the bottom wall, and a pair of side walls for connecting side portions of the ceiling wall and side portions of the bottom wall; and a back wall located at the back side of the peripheral wall and having connection terminals being able to connect to the connector in a direction parallel to the battery mounting surface. (d) The connector reception portion is configured such that, when the battery is housed in the housing portion of the enclosure, the battery cylindrical portion is positioned at the connector reception portion of the housing portion, and thereafter, while the battery is inclined so that the battery cylindrical portion is positioned diagonally forward down with respect to the battery mounting surface of the housing portion, the battery cylindrical portion is made to fit with the connector reception portion by insertion within the peripheral wall of the connector reception portion, and while the battery cylindrical portion fits with the connector reception portion, the battery is inclined so that an inclination angle becomes smaller while the battery is pushed forward, thereby the battery is laid on the battery mounting surface of the housing portion, and the connector is connected to the connection terminals in a direction parallel to the battery mounting surface. (e) The ring-shaped sealing member mounted along the outer circumference of the battery cylindrical portion is mounted so that a portion corresponding to the bottom wall of the connector reception portion is located behind a portion corresponding to the ceiling wall by a predetermined quantity in a battery insertion direction, and is inclined in a side surface view.

According to the electronic device of the present disclosure, the ring-shaped sealing member mounted along the outer circumference of the battery cylindrical portion is mounted so that the portion corresponding to the bottom wall of the connector reception portion of the enclosure is located behind the portion corresponding to the ceiling wall for the predetermined quantity in the battery insertion direction, and is inclined in the side surface view. Therefore, even in the case where the battery is inclined so that the battery cylindrical portion is located diagonally forward down, it is possible to suppress the applied unreasonable force to, in particular, the portion corresponding to the bottom side of the battery cylindrical portion of the sealing member. As a result, for example, it becomes possible to suppress a shortened life of the sealing member.

Additional benefits and advantages of the disclosed embodiments will be apparent from the specification and Figures. The benefits and/or advantages may be individually provided by the various embodiments and features of specification and drawings disclosure, and need not all be provided in order to obtain one or more of the same.

DETAILED DESCRIPTION

Figure 1:
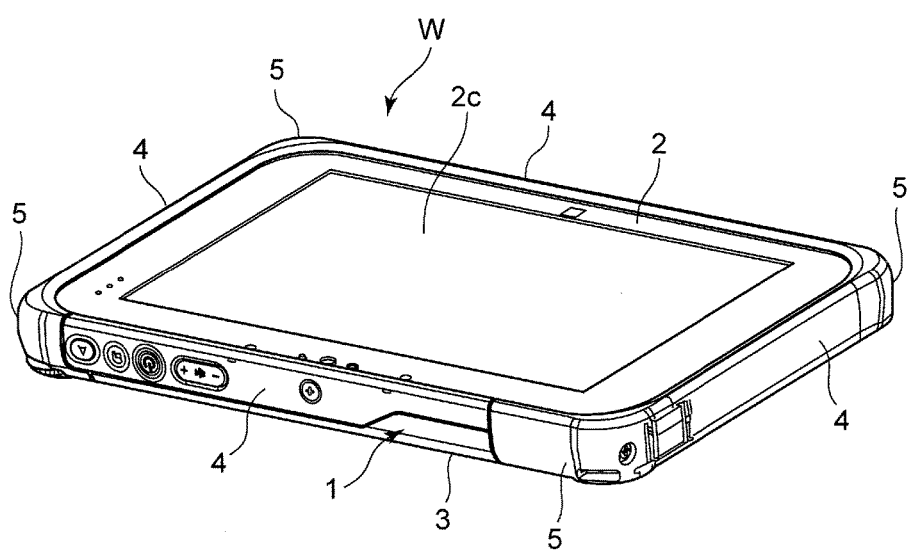
FIG. 1 is a perspective view showing a displaying surface side of a tablet terminal apparatus according to an embodiment of the present disclosure.

The electronic device according to the present disclosure can take the following aspects on the basis of the above-described configuration. That is, the above-described predetermined quantity may be set to become larger than a maximum dimension of a cross section of the sealing member.

According to this configuration, the portion corresponding to the bottom wall of the connector reception portion of the ring-shaped sealing member is located behind the portion corresponding to the ceiling wall for the quantity larger than the maximum dimension of the cross section of the sealing member in the battery insertion direction. Therefore, even in the case where the battery is inclined so that the battery cylindrical portion is located diagonally forward down, it is possible to more effectively suppress the applied unreasonable force to, in particular, the portion corresponding to the bottom side of the battery cylindrical portion of the sealing member. As a result, for example, it becomes possible to suppress a shortened life of the sealing member.

In addition, in the above case, the portion corresponding to the bottom wall of the connector reception portion of the outer circumference of the battery cylindrical portion may have a front surface portion being at least further forward than a mounting portion of the sealing member in the battery insertion direction, the front surface portion being inclined in an orientation opposed to the battery inclination direction at the time of battery housing operation.

According to this configuration, the portion corresponding to the bottom wall of the connector reception portion of the outer circumference of the battery cylindrical portion is configured so that at least the front surface portion behind the mounting portion of the sealing member in the battery insertion direction is inclined toward the direction opposed to such a direction that the battery is inclined at the time of a battery attachment and detachment operation. Accordingly, in the case where the battery is inclined so that the battery cylindrical portion is located diagonally forward down, it is possible to suppress an interference between the front surface portion and the bottom wall of the connector reception portion, and therefore, it is possible to facilitate an initial operation of a battery attachment and detachment operation.

Further, in the above-described case, the side walls of the outer circumference of the connector reception portion may have portions at least connected to the sealing member, the portion at least connected to the sealing member is inclined corresponding to an inclination of the sealing member.

According to this configuration, the side wall portion in the peripheral wall of the connector reception portion is configured so that at least the portion connected to the sealing member is inclined corresponding to the inclination of the sealing member, and therefore, it is possible to make the side wall portion compact, i.e., of a minimum size. It is noted that, in the case where at least the side wall portion is molded using a model such as fabrication, casting, or a forge of resin and the like, the side wall portion can be configured so as to incline the side wall portion using a draft at the time of molding.

Aspect of Embodiment

Embodiments will be described in detail below, appropriately referring to the drawings. Note that an unnecessarily detailed description may be omitted. For example, detailed descriptions of well-known matters or redundant descriptions of substantially the same configurations may be omitted. This is to avoid the following description from being unnecessarily redundant, and to facilitate understanding by those skilled in the art.

It is noted that the inventor(s) provides accompanying drawings and the following explanation in order for those skilled in the art to fully understand the present disclosure, and does not intend to limit claimed subject matters by the drawings and explanation.

In addition, in the following description, there is a case where terms for meaning a specific direction (for example, "top", "bottom", "left", "right", and the other terms including them, "clockwise direction", and "counterclockwise direction") are used. However, using them is to facilitate understanding of disclosures referred to drawings, and does not intend to limit the present disclosure by the meanings of these terms.

As an example, the embodiment of the present disclosure as described below is applied to a so-called tablet-type portable information terminal apparatus (hereinafter, arbitrarily, it is referred to as "tablet terminal apparatus" or simply as "apparatus").

Figure 2:
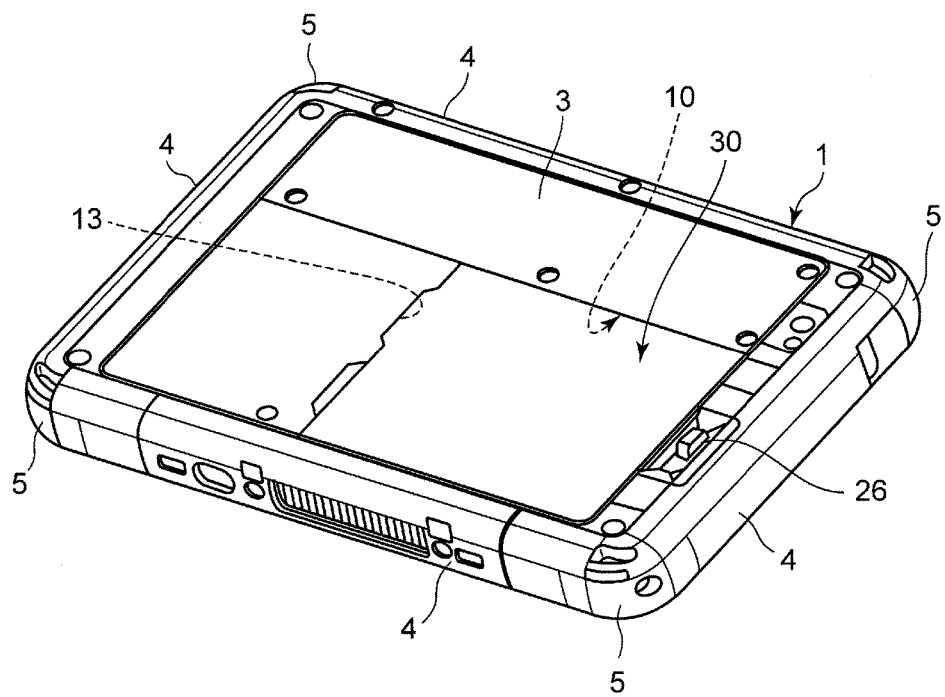
FIG. 2 is a perspective view showing a back surface side of the tablet terminal apparatus.

FIGS. 1 and 2 are perspective views showing a displaying surface side and a back surface side of the tablet terminal apparatus, respectively.

As shown in these drawings, a tablet terminal apparatus W according to the present embodiment is provided with an enclosure 1 formed approximately in a quadrangular shape in the planar view and having a predetermined thickness (height). This enclosure 1 has a top surface portion 2, a bottom surface portion 3 disposed in opposition to the top surface portion 2 in a vertical direction, and a side surface portion 4 for combining peripheral edge portions of these both surface portions 2 and 3 with each other, on an outer surface of the enclosure 1. The side surface portion 4 is configured so that two pairs of substantially flat surfaces disposed in opposition to each other become a main portion.

The main portion of the enclosure 1 is manufactured using metallic materials such as magnesium (Mg) and the like in order to ensure mechanical stiffness and the like. However, a required side portion including each corner portion of a quadrangular-shaped portion is covered with a cover body 5 manufactured with the elastomer and the like whose elasticity is higher than that of the materials of the enclosure 1. For example, this cover body 5 is fixed to the enclosure 1 made of Mg using screw members and the like.

A display screen 2c using a liquid crystal and the like is arranged on the top surface portion 2 of the enclosure 1. For example, this display screen 2c can also be used as an input screen of a touch-sensitive panel type. On the other hand, as shown in FIG. 2, a battery pack 30 is mounted as a portable power source at the bottom surface portion 3 (back surface side) of the enclosure 1. As fully understood from FIG. 3 and FIG. 4, the battery pack 30 has a predetermined thickness, and is formed approximately in a quadrangular shape in a plane view. This battery pack 30 is attached and detached, not from the side surface portion 4 of the enclosure 1, but from the bottom surface portion 3 side (back surface side) of the enclosure 1.

Figure 8:
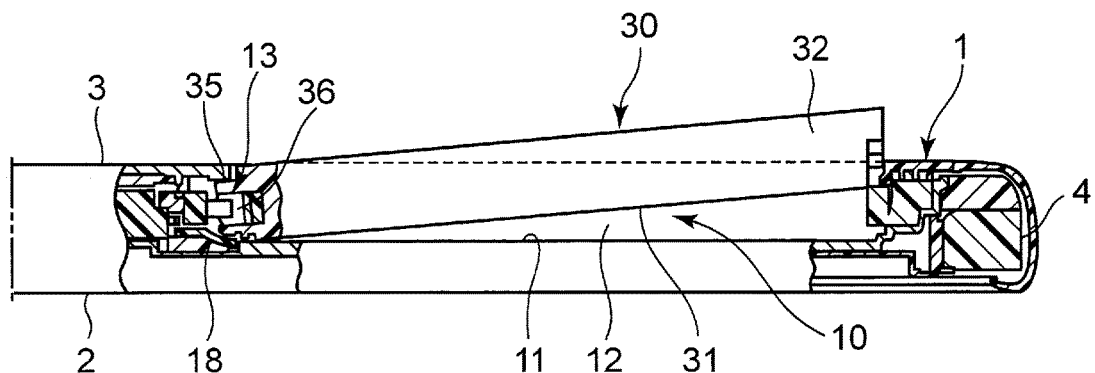
FIG. 8 is a partial longitudinal cross-sectional view of the tablet terminal apparatus and the battery in order to explain the mounting operation of the battery.

A battery housing portion 10 is provided for housing the mounted battery pack 30 at the bottom surface portion 3 (back surface side) of the enclosure 1. As shown in FIG. 8 as described below, the battery housing portion 10 is formed as a recessed portion formed to be opened to the back surface side, and has a battery mounting surface 11 for receiving a mounting surface 31 of the battery pack 30, and a side wall portion 12, which is formed in the circumference of the battery mounting surface 11, and which is opposed to a side surface 32 of the battery pack 30. The battery pack 30 is housed inside the battery housing portion 10 in such a state that the mounting surface 31 of the battery pack 30 is laid on the battery mounting surface 11, and the side surface 32 is surrounded by the side wall portion 12. A shape and a height of the side wall portion 12 of the battery housing portion 10 are set to be such a shape and a measurement that the battery pack 30 can be accommodated without instability. It is noted that a lock portion 26 for restraining the housed battery pack 30 in the housed state is provided at one end side of the battery housing portion 10.

Figure 3:
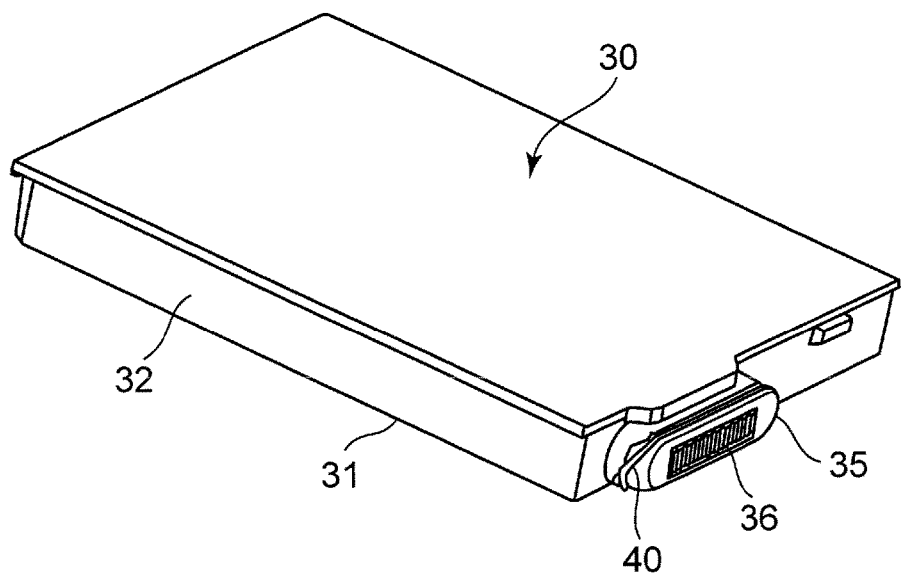
FIG. 3 is a perspective view of a battery mounted in the tablet terminal apparatus.
Figure 4:
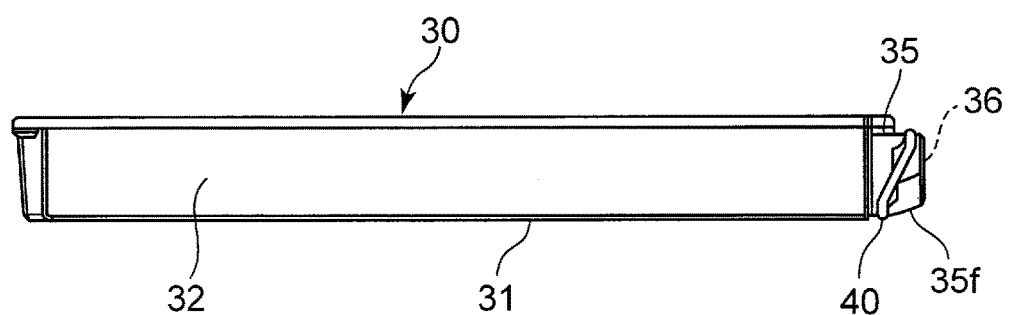
FIG. 4 is a side view of the battery.

As shown in FIG. 3 and FIG. 4, an elliptically-shaped cylindrical portion 35 (battery cylindrical portion) is integrally formed at the one end side of the battery pack 30 in the front surface view, and a connector 36 (battery connector) is arranged at the front surface portion of this battery cylindrical portion 35. In addition, a ring-shaped sealing member 40 (seal ring) is mounted in the outer circumference portion of this battery cylindrical portion 35. This seal ring 40 is manufactured with a material having a high elasticity such as rubber and flexible resin. The cross-sectional shape of the seal ring 40 is formed in, for example, a circular shape.

Figure 5:
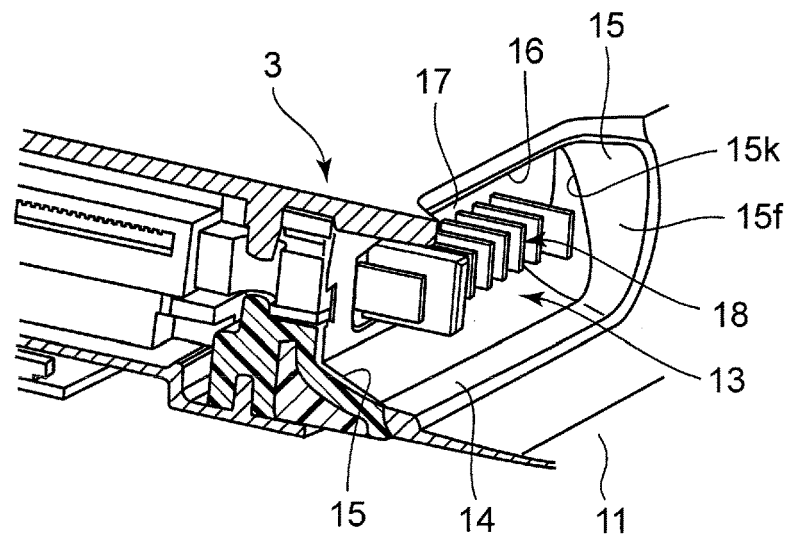
FIG. 5 is a perspective view showing a connector reception portion of the tablet terminal apparatus.
Figure 6:
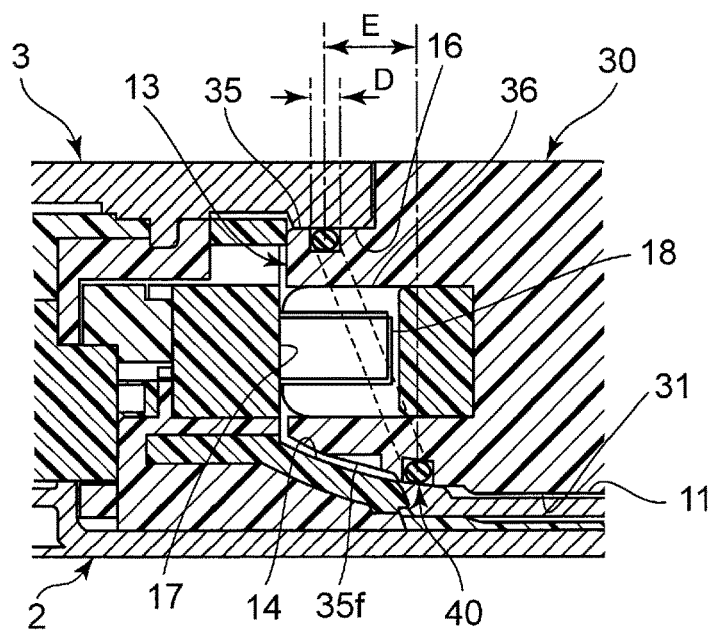
FIG. 6 is a partially-enlarged longitudinal cross-sectional view showing the connector reception portion and a cylindrical portion of the battery in a battery mounting state.

On the other hand, as shown in FIG. 5 and FIG. 6, a connector reception portion 13 for receiving the battery cylindrical portion 35 is provided at the side wall portion 12 of the side portion opposed to the lock portion 26 of the battery housing portion 10 of the enclosure 1 so that the side wall portion 12 is opened along the battery mounting surface 11. This connector reception portion 13 is a peripheral wall for inserting and fitting the battery cylindrical portion 35. The connector reception portion 13 is provided with a peripheral wall configured to include a bottom wall 14 formed on the same surface as that of the battery mounting surface 11, a ceiling wall 16 disposed in opposition to the bottom wall 14, and a pair of side walls 15 for connecting between side portions of the ceiling wall 16 and side portions of the bottom wall 14. Further, the connector reception portion 13 is provided with a back wall 17, which is located at the back side of the peripheral wall and has connection terminals 18 connectable to the battery connector 36 in a direction parallel to the battery mounting surface 11.

Figure 7:
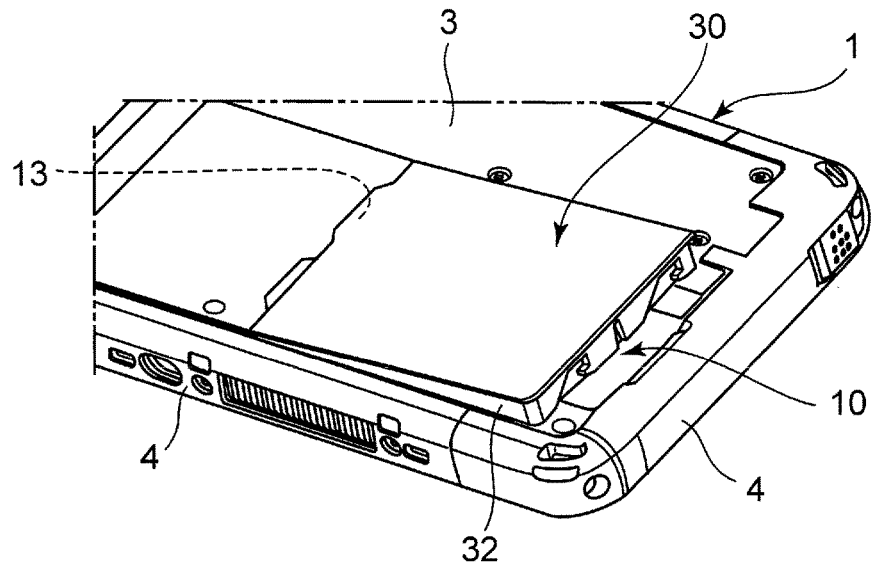
FIG. 7 is a perspective view of a back surface side of the tablet terminal apparatus and the battery in order to explain a mounting operation of the battery.
Figure 9:
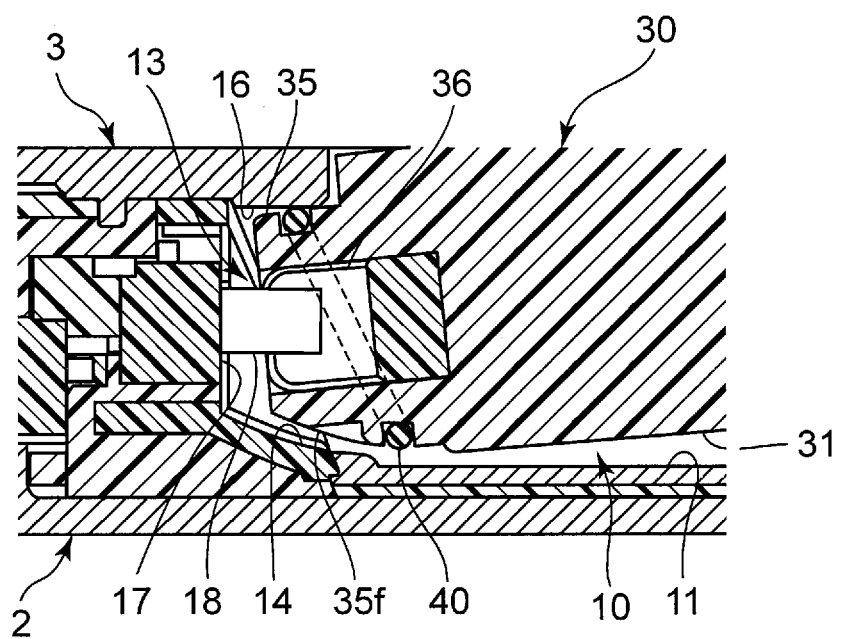
FIG. 9 is a partially-enlarged longitudinal cross-sectional view showing the connector reception portion and the cylindrical portion of the battery in an initial state of the mounting operation of the battery.

When the battery pack 30 is housed within the battery housing portion 10 of the enclosure 1, the battery cylindrical portion 35 of the battery pack 30 is positioned at the connector reception portion 13 of the battery housing portion 10, and thereafter, as shown in FIG. 7, FIG. 8, and FIG. 9, while the battery pack 30 is inclined with respect to the battery mounting surface 11 of the battery housing portion 10 so that the battery cylindrical portion 35 is located diagonally forward down, the battery cylindrical portion 35 is inserted and fitted within the peripheral wall of the connector reception portion 13. Then, in this inserted-and-fitted-state, the battery pack 30 is inclined and is laid on the battery mounting surface 11 of the battery housing portion 10 so that the inclination angle becomes smaller while pushing the battery pack 30 forward (to the left side in FIG. 8). Therefore, the battery connector 36 is made to connect to the connection terminals 18 in a direction parallel to the battery mounting surface 11. It is noted that, when taking the mounted battery pack 30 out of the battery housing portion 10, a pulling operation including a reverse process of the mounting operation as described above may be performed.

In the present embodiment, as fully understood in FIG. 6 and FIG. 9, when the battery pack 30 is attached and detached with respect to the battery housing portion 10, the inclination of the battery pack 30 is relatively larger (see FIGS. 7 to 9), etc., for the purpose of the suppression of the applied unreasonable force to the seal ring 40 mounted along the outer circumference of the battery cylindrical portion 35, the seal ring 40 is inclined and mounted in the side surface view so that the portion corresponding to the bottom wall 14 of the connector reception portion 13 is located behind the portion corresponding to the ceiling wall 16 by a predetermined quantity E in the battery insertion direction (left hand in FIGS. 6 to 9).

By adopting such a configuration, for example, when the battery pack 30 is attached and detached with respect to the battery housing portion 10, even in the case where the battery pack 30 is inclined so that the battery cylindrical portion 35 is located diagonally forward down, it is possible to suppress the applied unreasonable force to, in particular, a portion corresponding to a bottom side of the battery cylindrical portion 35 of the seal ring 40. As a result, for example, it becomes possible to suppress a shortened life of the seal ring 40.

In the present embodiment, in particular, the predetermined quantity E is set to be larger than the maximum dimension D (in the present embodiment, a diameter dimension of a circular cross section) of the cross section of the seal ring 40.

In this case, in particular, the predetermined quantity E (for which the seal ring 40 is mounted so that the portion corresponding to the bottom wall 14 of the connector reception portion 13 is located behind the portion corresponding to the ceiling wall 16 in the battery insertion direction) is larger than the maximum dimension of the cross section of the seal ring 40. Therefore, even in the case where the battery pack 30 is inclined so that the battery cylindrical portion 35 is located diagonally forward down, it is possible to more effectively suppress the applied unreasonable force to, in particular, the portion corresponding to the bottom side of the battery cylindrical portion 35 of the seal ring 40. It is noted that the cross-sectional shape of the seal ring 40 is not limited to the circular shape as described above, for example, the cross-sectional shape of the seal ring 40 may be other shapes such as an elliptical shape and a quadrangular shape.

In addition, in the present embodiment, the portion (bottom side portion) corresponding to the bottom wall 14 of the connector reception portion 13 of the outer circumference of the battery cylindrical portion 35 is formed so that at least the front surface portion 35f (see FIGS. 4, 6, and 9) behind the mounting portion of the seal ring 40 in the battery insertion direction is inclined (inclined diagonally forward up) in a direction opposed to a battery inclination direction (that is, a forwardly downward direction) at the time of the battery housing operation.

Accordingly, in the case where the battery is inclined so that the battery cylindrical portion 35 is located diagonally forward down (see FIGS. 7 to 9), it is possible to suppress interference of the front surface portion 35f with the bottom wall 14 of the connector reception portion 13, and therefore, it is possible to facilitate the initial operation of the battery attachment and detachment.

Further, in the present embodiment, the side wall portion 15 in the peripheral wall of the connector reception portion 13 is formed so that at least a portion 15f (see FIG. 5) contacted to the seal ring 40 is inclined along an inclination line 15k corresponding to an inclination of the seal ring 40.

By adopting such a configuration, it is possible to make the side wall portion 15 in the peripheral wall of the connector reception portion 13 compact, i.e., of a minimum size. In addition, as described above, in the present embodiment, the enclosure 1 is manufactured using metallic materials such as magnesium (Mg) and the like. However, the present disclosure is not limited thereto. For example, in the case where this enclosure 1 is molded using a model such as a casting method or an injection molding method, the enclosure 1 may be configured to incline the side wall portion 15 using a punched gradient at the time of molding.

As described above, the embodiments are described as examples of the technique according to the present disclosure. To this end, the detailed description and accompanying drawings are provided.

Therefore, the components described in the detailed description and accompanying drawings may include not only those components necessary to solve the problems, but also those components to exemplify the technique and not necessary to solve the problems. Hence, the unnecessary components should not be judged to be necessary just because the unnecessary components are described in the detailed description and accompanying drawings.

The embodiment as described above is applied to a so-called tablet terminal apparatus as an example. However, the embodiment of the present disclosure is not limited thereto. For example, the embodiment of the present disclosure can be applied to various electronic devices.

The above-described embodiments are examples of the technique according to the present disclosure, and therefore, it is possible to make various changes, substitutions, additions, omissions, etc., within the scope of the claims or their equivalency.

What is claimed is:

1. A battery to be mounted on an electronic device, the battery comprising:
   a connector which is to be electrically connected to a connection terminal of the electronic device, and
   a ring-shaped sealing member which is mounted on an outer circumference of the connector,
   wherein the ring-shaped sealing member is obliquely inclined with respect to an insertion direction of the battery such that a first radial end of the ring-shaped sealing member is in front, in the insertion direction of the battery, of a second radial end of the ring-shaped sealing member, the second radial end of the ring-shaped sealing member being opposite to the first radial end of the ring-shaped sealing member across the connector in a direction perpendicular to the insertion direction of the battery.

2. The battery according to claim 1, wherein a front surface portion of the battery is obliquely inclined with respect to the insertion direction of the battery.

3. An electronic device comprising:
   a battery which is mounted on the electronic device,
   wherein the battery includes:
   a connector which is electrically connected to a connection terminal of the electronic device, and
   a ring-shaped sealing member which is mounted on an outer circumference of the connector,
   wherein the ring-shaped sealing member is obliquely inclined with respect to an insertion direction of the battery such that a first radial end of the ring-shaped sealing member is in front, in the insertion direction of the battery, of a second radial end of the ring-shaped sealing member, the second radial end of the ring-shaped sealing member being opposite to the first radial end of the ring-shaped sealing member across the connector in a direction perpendicular to the insertion direction of the battery.

4. The electronic device according to claim 3, wherein a front surface portion of the battery is obliquely inclined with respect to the insertion direction of the battery.

5. The electronic device according to claim 4, wherein a bottom wall of the electronic device is obliquely inclined opposite to the front surface portion of the battery.

6. A battery to be mounted on an electronic device, the battery comprising:
   a connector which is to be electrically connected to a connection terminal of the electronic device, and
   a ring-shaped sealing member which is mounted on an outer circumference of the connector,
   wherein the ring-shaped sealing member is obliquely inclined with respect to a longitudinal axis of the battery such that a first radial end of the ring-shaped sealing member is in front, in an axial direction of the battery, of a second radial end of the ring-shaped sealing member, the second radial end of the ring-shaped sealing member being opposite to the first radial end of the ring-shaped sealing member across the connector in a radial direction of the battery.

7. The battery according to claim 6, wherein a front surface portion of the battery is obliquely inclined with respect to the longitudinal axis of the battery.

* * * * *